United States Patent [19]
Gross et al.

[11] Patent Number: 5,991,860
[45] Date of Patent: Nov. 23, 1999

[54] ROOT FILE SYSTEM SIZE INCREASE ON A UNIX BASED COMPUTER SYSTEM

[75] Inventors: Danny Brice Gross, Bastrop; Michael Douglas O'Donnell, Austin; Gene Regis Toomey, Kyle, all of Tex.

[73] Assignee: Advanced Micro Devices, Inc., Sunnyvale, Calif.

[21] Appl. No.: 08/841,539

[22] Filed: Apr. 23, 1997

[51] Int. Cl.[6] .............................. G06F 12/16; G06F 12/00
[52] U.S. Cl. ........................... 711/173; 711/115; 711/202
[58] Field of Search .................... 711/101, 115, 711/170, 173, 200, 202

[56] References Cited

U.S. PATENT DOCUMENTS

| | | | |
|---|---|---|---|
| 4,855,903 | 8/1989 | Carleton et al. | 364/200 |
| 4,918,653 | 4/1990 | Johri et al. | 364/900 |
| 4,958,273 | 9/1990 | Anderson et al. | 364/200 |
| 5,155,837 | 10/1992 | Liu et al. | 395/500 |
| 5,155,847 | 10/1992 | Kirouac et al. | 395/600 |
| 5,276,867 | 1/1994 | Kenley et al. | 395/600 |
| 5,341,494 | 8/1994 | Thayer et al. | 395/425 |
| 5,454,103 | 9/1995 | Coverston et al. | 395/600 |
| 5,490,260 | 2/1996 | Miller et al. | 395/427 |
| 5,539,899 | 7/1996 | Huynh et al. | 395/497.02 |
| 5,574,841 | 11/1996 | Rathunde | 395/182.05 |
| 5,577,233 | 11/1996 | Goettelmann et al. | 395/500 |
| 5,627,995 | 5/1997 | Miller et al. | 395/497.02 |
| 5,675,795 | 10/1997 | Rawson, III et al. | 395/652 |
| 5,678,042 | 10/1997 | Pisello et al. | 395/610 |
| 5,696,897 | 12/1997 | Dong | 395/182.13 |
| 5,696,968 | 12/1997 | Merkin | 395/652 |
| 5,701,516 | 12/1997 | Cheng et al. | 395/842 |
| 5,715,464 | 2/1998 | Crump et al. | 395/750 |
| 5,737,745 | 4/1998 | Matsumoto et al. | 711/114 |
| 5,771,354 | 11/1993 | Crawford | 395/200.59 |
| 5,778,395 | 7/1998 | Whiting et al. | 707/204 |
| 5,790,849 | 8/1998 | Crocker et al. | 395/652 |
| 5,802,297 | 9/1998 | Engquist | 395/200.42 |
| 5,805,903 | 5/1996 | Elkhoury | 395/750.01 |
| 5,809,564 | 9/1998 | Craze et al. | 711/208 |

*Primary Examiner*—John W. Cabeca
*Assistant Examiner*—David Ransom
*Attorney, Agent, or Firm*—Skjerven, Morrill, MacPherson, Franklin & Friel, L.L.P.; Stephen A. Terrile; Michael P. Noonan

[57] ABSTRACT

A method for increasing the size of a root file system on a computer system operating under control of a UNIX type operating system. The computer system includes a first storage device. The first storage device includes a root partition. The root partition includes a root file system. The method includes booting the computer system to a single user mode, increasing the size of the root partition and the root file system without reinstalling the UNIX type operating system, and rebooting the computer system.

27 Claims, 5 Drawing Sheets

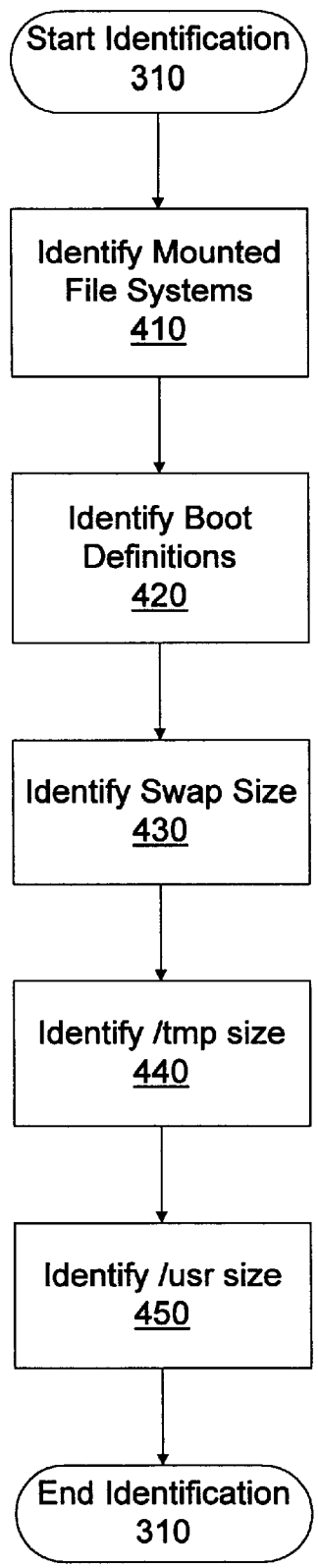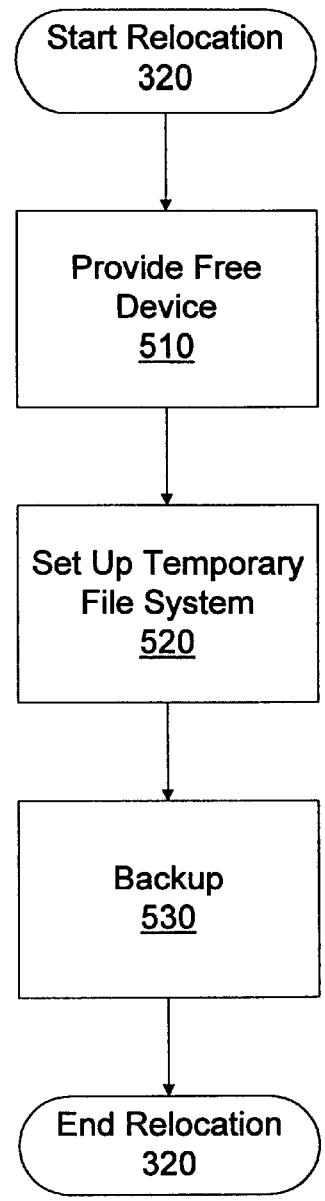
Figure 4
Figure 5

ROOT FILE SYSTEM SIZE INCREASE ON A UNIX BASED COMPUTER SYSTEM

CROSS-REFERENCE TO RELATED APPLICATIONS

This application relates to co-pending application, Ser. No. 08/841,513 (Attorney Reference Number: M-4633 US), filed on the same day as the present application and, entitled "Swap Size Decrease on a UNIX Based Computer System", by Danny B. Gross, Michael D. O'Donnell and Gene R. Toomey, and which is incorporated herein by reference.

This application relates to co-pending application, Ser. No. 08/841,512 (Attorney Reference Number: M-4634 US), filed on the same day as the present application and, entitled "Primary Swap Size Increase on a UNIX Based Computer System", by Danny B. Gross, Michael D. O'Donnell and Gene R. Toomey, and which is incorporated herein by reference.

This application relates to co-pending application, Ser. No. 08/841,540 (Attorney Reference Number: M-4635 US), filed on the same day as the present application and, entitled "Root Size Decrease on a UNIX Based Computer System", by Danny B. Gross, Michael D. O'Donnell and Gene R. Toomey, and which is incorporated herein by reference.

BACKGROUND

1. Field of the Invention

This invention relates to computer systems and, more particularly, to methods of increasing the size of root file systems on UNIX type operating system based computer systems.

2. Description of the Related Art

Computer systems are information handling systems which can be designed to give independent computing power to one user or a plurality of users. Computer systems have attained widespread use in providing computer power to many businesses and institutions. Some important applications in which computer systems have become common include manufacturing monitoring and control; electrical, mechanical, and chemical system design and simulation; and network management and service. Productive processing time is of great importance to the users of these computer applications because system down time can result in significant costs.

Computer systems are designed to provide a degree of system availability that is necessitated by the applications for which the computer system is intended. System availability ranges from the ability of a system to remain functional in spite of failures in a portion thereof, to the minimization of a system's down-time in the event of a failure or necessary upgrade. High availability (HA) computer systems, as their name implies, are required to be available, or "on," virtually all of the time. For example, because many computer applications involve the use of network servers to provide processor power to multiple users, it is important that the network server be available as much as possible. Such computer systems (or networks of such computer systems) should be capable of being upgraded with minimal system down time.

High availability computer systems must be able to restart as soon as possible after a system upgrade. System upgrades or patches are often necessitated by the establishment of new system requirements. Unfortunately, performing a system upgrade such as resizing the root file system on a UNIX based computer system requires that the computer system be powered down or turned off, and that the operating system be reinstalled with the required changes.

Commonly, when a computer system requires an upgrade, patches are made to the operating system of the computer system. Often, new patches are added to the patches from a previous system upgrade resulting in a large number of patches for each successive upgrade. The successful patches are then updated to other computer systems by replacing the present operating system of those computer systems with the new operating system including the successful patches. The new operating system is often installed from a storage device such as a tape drive to directly replace the present operating system needing the upgrade. Alternatively, the new operating system can be downloaded over a network.

Use of the method set forth above has certain consequences. Notably, using this method usually requires that the computer system be shut down. A backup of the present operating system usually must be made, and the upgrades or patches must be loaded while the computer system is down. Additionally, upgrades must often be made for multiple computer systems, causing down-time for all the systems involved. For example, in a network of servers, each server must be upgraded individually. That is, the system manager must power down a server, thereby limiting server availability by preventing user access, make a backup of the present operating system, load the new operating system, and test the new operating system. The system manager then repeats these actions for each of the other servers. The computer system being upgraded is usually down throughout the procedure, possibly for a period of hours. The cost for system downtime during these upgrades can be significant. Also, the chances for error or failure can be significant with this practice.

An alternative method of upgrading a computer system while the computer system is operating has been developed. An operating system may be upgraded by selecting and preparing a new boot device while the computer system is functioning, loading the new operating system onto the boot device while the computer system is functioning, and rebooting the computer system. Such a method upgrades a target system while lessening the target system's resulting down. Such a method of upgrading computer systems is disclosed in U.S. patent application Ser. No. 08/785,491, attorney docket No. M-4525 US, filed on Jan. 17, 1997, entitled "Installing Operating Systems Changes on a Computer System," naming Danny B. Gross, Michael D. O'Donnell and Gene R. Toomey as inventors.

SUMMARY

It has been discovered that a computer system may be upgraded by increasing the size of the swap space of the computer system without having to reinstall the operating system on the computer system or preparing an alternate boot device. Such a procedure advantageously allows the computer system to be upgraded while minimizing the computer system's resulting down time and minimizing potential errors during operating system reinstallation. Thus, the reliability and efficiency of making upgrades is improved with a simplified upgrade procedure that also reduces costs resulting from computer system upgrades requiring root file system increases.

In one embodiment of the invention, a method for increasing the size of a root file system on a computer system operating under control of a UNIX type operating system is provided. The computer system includes a first storage device. The first storage device includes a root partition. The root partition includes a root file system. The method includes booting the computer system to a single user mode, increasing the size of the root partition and the root file system without reinstalling the UNIX type operating system, and rebooting the computer system.

In another embodiment, a first computer system is configured to upgrade a second computer system operating under control of a UNIX type operating system. The second computer system includes a root file system. The first computer system includes a first remote boot module, a partition resize module, a file system resize module, and a second remote boot module. The first remote boot module remotely boots the second computer system to a single user mode. The partition resize module increases the size of the root partition without reinstalling the UNIX type operating system on the second computer system. The file system resize module increases the size of the root file system without reinstalling the UNIX type operating system on the second computer system. The second remote boot module remotely reboots the second computer system.

In another embodiment, an apparatus for increasing the size of the root file system on a first computer system without reinstalling an operating system on the first computer system is provided. The apparatus includes a computer-readable storage medium and an upgrade module stored on the computer-readable storage medium. The upgrade module upgrades a first computer system responsive to being accessed on a second computer system. The first computer system operates under control of a UNIX type operating system. The first computer system includes a root file system. The first computer system is upgraded by increasing the size of the root file system without reinstalling the UNIX type operating system.

BRIEF DESCRIPTION OF THE DRAWINGS

The present invention may be better understood, and its numerous objects, features, and advantages made apparent to those skilled in the art by referencing the accompanying drawings.

FIG. 4 shows a flow chart for identifying the file system layout of the exemplary computer system of FIG. 1 according to an embodiment of the invention.

FIG. 5 shows a flow chart for relocating stored information according to an embodiment of the invention.

The use of the same reference symbols in different drawings indicates similar or identical items.

DETAILED DESCRIPTION

The following sets forth a detailed description of the preferred embodiments. The description is intended to be illustrative of the invention and should not be taken to be limiting. Many variations, modifications, additions, and improvements may fall within the scope of the invention as defined in the claims which follow.

In one embodiment, a computer system is upgraded to increase the size of the root file system. The computer system is rebooted into single user mode and the root volume group is activated. Once the root volume group is activated, information stored near or adjacent to the root logical volume is prepared for relocation to make space for a larger root file system. The root logical volume is then increased in size and the root file system is then increased in size. The information that was near the previously smaller root file system is returned to a position near the presently larger root file system. The computer system is rebooted to bring the computer system on line with the larger root file system.

Figure 1:
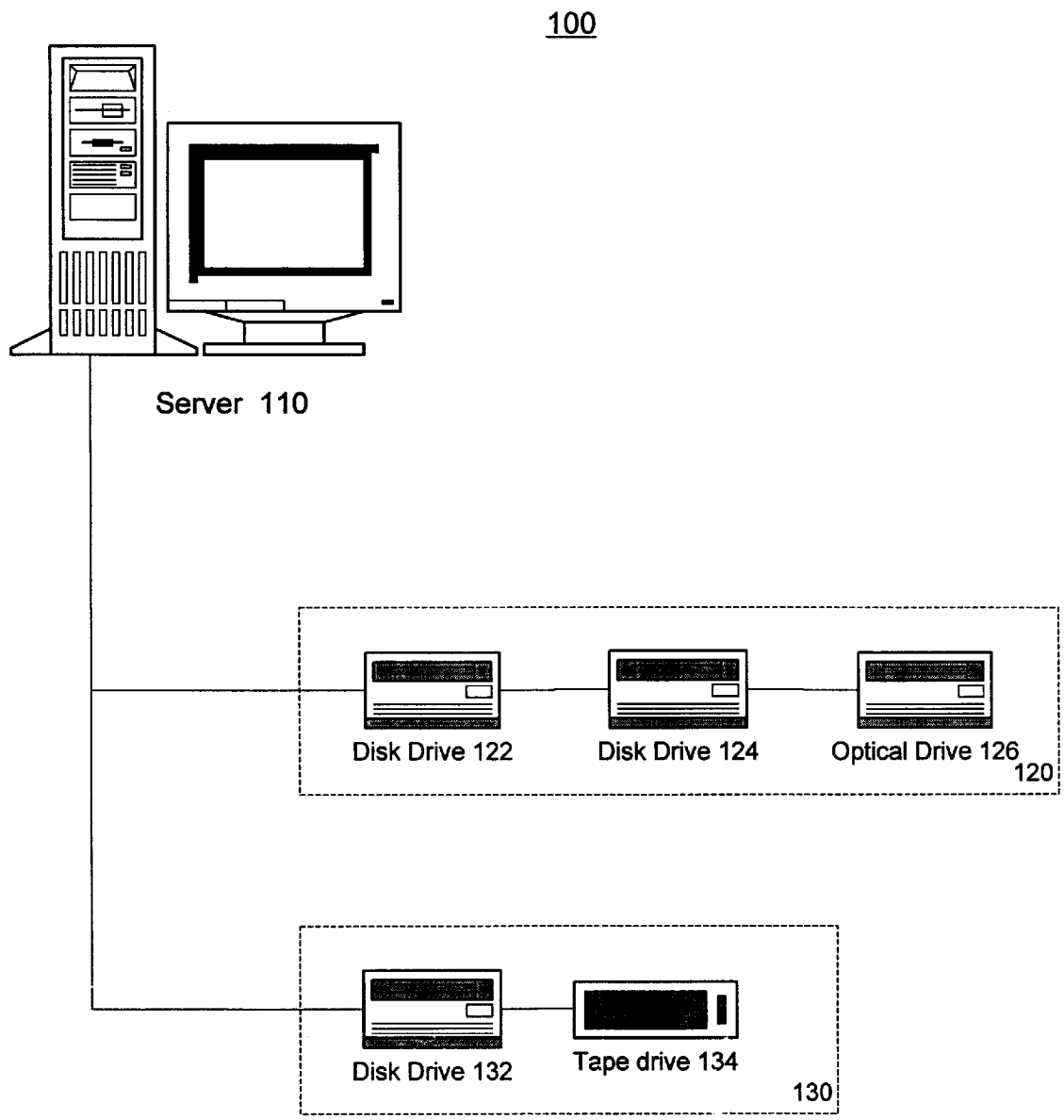
FIG. 1 shows an exemplary a network of computer systems according to an embodiment of the invention.

Referring to FIG. 1, exemplary computer system 100 includes server 110 which is coupled to various memory storage devices. The memory storage devices are coupled to server 110 by Small Computer System Interface (SCSI) chains 120 and 130. The memory storage devices include disk drives 122 and 124 and optical disk drive 126 in SCSI chain 120, and disk drive 132 and tape drive 134 in SCSI chain 130.

In one embodiment, computer system 100 is, for example, a Hewlett Packard Series 800 computer system running the HP-UX 9.04 type UNIX operating system. Such a computer system may function as a server for other computer systems. It is understood that other computer systems and other UNIX operating systems (e.g., International Business Machines AIX operating system) may be used in accordance with the invention. Additionally, although the disk drives are connected to their respective computer systems in SCSI chains in the preferred embodiment, any appropriate connection means may be used in accordance with the invention. Further although computer system 100 includes server 110, computer system 100 may include any type of computer system, including, for example, mainframes, minicomputers, workstations and personal computer systems.

Exemplary computer system 100 operates under control of the optional Logical Volume Manager (LVM) subsystem of the HP-UX operating system. The LVM system enables system administrators to manage disk space in terms of volume groups and logical volumes rather than, or in addition to, fixed-sized disk sections. A volume group can include, for example, multiple physical volumes (physical disks) and/or multiple logical volumes (logical disks).

Specifically, the storage of a computer system configured according to the LVM system consists of groupings of disks initialized for LVM and organized into volume groups. A volume group might include one or many LVM disks, and an entire system may include one or several volume groups. Just as volume groups are groupings of one or more physical LVM disks, also called physical volumes, volume groups are also subdivided into virtual disks, called logical volumes.

A logical volume is a partition. As such, a logical volume is a distinct portion of a storage device that functions as though it were a physically separate unit. Logical volumes can encompass space on one or more physical volumes, span physical volumes, and/or represent only a portion of a physical volume. Like disk sections, logical volumes can hold file systems, swap areas, and raw data. For example, a logical volume can include a file system for storing data, or a logical volume can merely provide space for the temporary storage of data. Disk space in a volume group is apportioned by creating logical volumes. The size of a logical volume is determined by its number of extents, each being four megabytes by default, and is configurable. File systems and swap space are then assigned to the logical volumes within the volume group.

Typically, using basic UNIX commands, a logical volume can be created and extended to allocate sufficient space for a file system, user application, or raw data. New file systems may be mounted or applications installed on the logical volume. The same approach may be used when increasing the capacity of a file system created on a logical volume.

The root volume group is a special volume group that includes the system boot disks, storage areas designated for containing specific data such as the root file system (/)logical volume and the file system containing/usr, storage areas with designated space for storing temporary data such as the primary swap logical volume and the file system containing/tmp. The root, swap and usr logical extents may be mapped to physical extents on the same physical disk or on different physical disks within the root volume group. Typically, the boot area is at a specific region on the same physical volume that contains the root logical volume.

The root logical volume contains the operating system software and has certain restrictions that do not apply to regular logical volumes. The root logical volume should be located at a specific location on a bootable disk so the root file system can always be found on the disk containing it. Furthermore, the root logical volume should be created with contiguous allocation of physical extents. Also, the size of the root logical volume is typically predetermined since the root (/) file system is not unmountable and unmounting a file system is considered a prerequisite for extending the file system's size.

Figure 2:
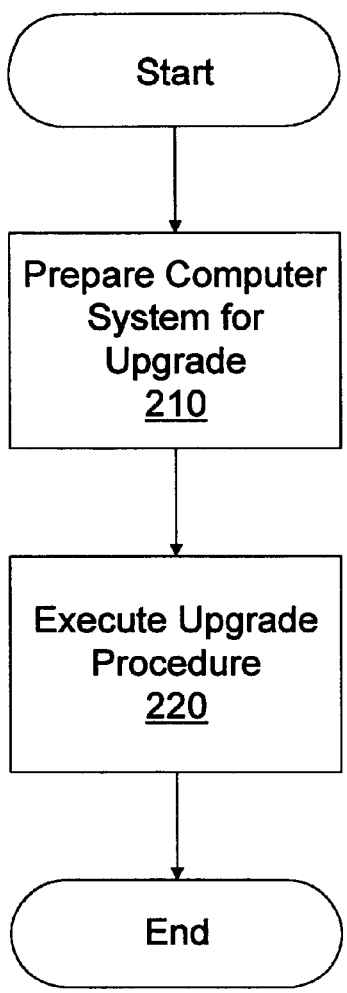
FIG. 2 shows a flow chart for increasing the size of the root file system according to an embodiment of the invention.

FIG. 2 shows a flow chart of the operation of an upgrade module for upgrading computer system 100 by increasing the size of the root file system without unmounting the root file system. At prepare step 210, computer system 100 is prepared for upgrading. Prepare step 210 is further disclosed below and in FIGS. 3–5. After computer system 100 is prepared for upgrading, control transitions to execute step 220. During execute step 220, computer system 100 is upgraded by increasing the size of the root file system. Execute step 220 is further disclosed below and in FIGS. 6 and 7. It is appreciated that the upgrade module and other modules discussed herein may consist of directly entered commands, or steps executed by a software module or a hardware module either directly on computer system 100 or remotely on computer system 100 from another computer system.

Figure 3:
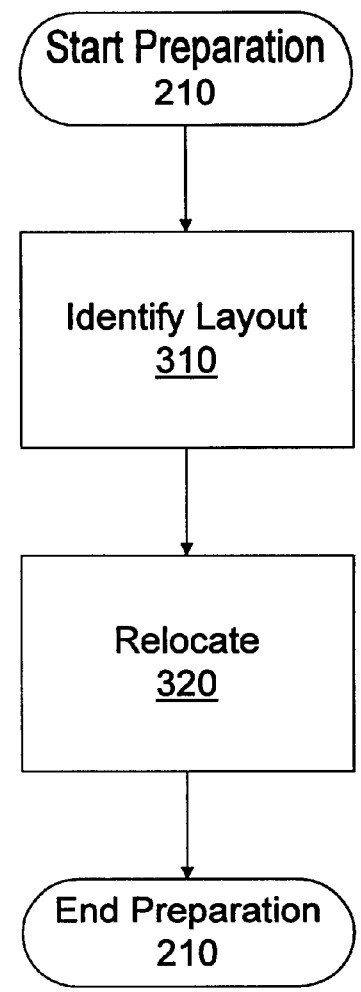
FIG. 3 shows a flow chart for preparing the exemplary computer system of FIG. 1 for being upgraded according to an embodiment of the invention.

FIG. 3 shows a flow chart of the operation of a prepare module for preparing computer system 100 according to prepare step 210. At identify layout step 310, the layouts of the root volume group and the boot device are identified to facilitate relocation of any information stored near or adjacent to the root file system. Identify layout step 310 is further disclosed below and in FIG. 4. Control then transitions to relocate step 320. During relocate step 320, information that is near the root file system is moved to make space for the prospectively larger root file system. Relocate step 320 is further disclosed below and in FIG. 5.

FIG. 4 shows a flow chart of the operation of an identification module for identifying the layout of the root volume group and the boot device according to identify layout step 310. The layout of the root volume group is determined so that data file systems or space file systems that are near the root logical volume group such that the expansion of the root logical volume is impeded can be identified and relocated or removed. At identify mounts step 410, the mounted file systems are identified. For example, the bdf command identifies the file systems mounted to a particular volume group. In exemplary computer system 100, the command bdf -t hfs | grep vg00 yields the following exemplary output regarding the volume group vg00:

| Filesystem | Size | Used | Available | Capacity | Mounted on |
|---|---|---|---|---|---|
| /dev/vg00/lvol1 | 250953 | 146336 | 79521 | 65% | / |
| /dev/vg00/lv0l4 | 438025 | 370492 | 23730 | 94% | /usr |
| /dev/vg00/lvol3 | 151273 | 54057 | 82088 | 40% | /tmp |

Thus, the/usr file system uses 370,492 kilobytes of the file systems capacity of 438,025 kilobytes, and/tmp uses 54,057 kilobytes of the file system's capacity of 151,273 kilobytes.

Control then transitions to identify boot step 420. During identify boot step 420, the lvlnboot command with a specified option -v and no other arguments prints a verbose message including information on all volume groups. Thus, the command lvlnboot -v yields the following exemplary output:

Boot Definitions for Volume Group/dev/vg00: Physical Volumes belonging in Root volume Group: /dev/dsk/c0d0s2—Boot Disk Root: lvol1 on:/dev/dsk/c0d0s2

Swap: lvol2 on:/dev/dsk/c0d0s2

No Dump Logical Volume configured

Thus, the boot disk is c0d0s2. In this embodiment, one boot disk is defined. If another boot disk is defined, the other boot disk would be removed using the lvrmboot -r command followed by an argument naming the other boot disk.

Control then transitions to identify swap size step 430. During identify swap size step 430, the size of the swap logical volume is identified. The lvdisplay command displays information about logical volumes. Specifically, the lvdisplay command displays the characteristics and status of each logical volume specified in the command line. Thus, the command lvdisplay/dev/vg00/lvol2| grep size shows the size of the primary swap logical volume (lvol2) and yields the following exemplary output:

LV Size (Mbytes) 152.

Control then transitions to identify/tmp size step 440. During identify/tmp size step 440, the size of the/tmp logical volume is identified. The command lvdisplay/dev/vg00/lvol3 shows the size of the/tmp logical volume and yields the following exemplary output:

LV Size (Mbytes) 152| grep size

Thus, the size of the/tmp logical volume is 152 megabytes and the size of the/tmp file system is approximately 151.2 megabytes (see identify mounts step 410 above).

Control then transitions to identify/usr size step 450. During identify/usr size step 450, the size of the/usr logical volume is identified. The command lvdisplay/dev/vg00/lvol4 shows the size of the/usr logical volume and yields the following exemplary output:

LV Size (Mbytes) 440| grep size

Thus, the size of the/usr logical volume is 440 megabytes, and the size of the/usr file system is approximately 438 megabytes (see identify mounts step 410 above).

After the layout of the root volume group and the boot device are identified during identify layout step 310 (steps 410–450), control transitions to relocate step 320. FIG. 5 shows a flow chart of the operation of an relocation module for relocating information that resides in an area near the root file system according to relocate step 320. The root logical volume and the primary swap logical volume must each be contiguous in memory space according to the system requirements of computer system 100. The root logical volume must be increased in size so that the root file system may be increased. Logical volumes that reside on root disk drive 122 near the root logical volume must be moved out of the way or removed temporarily to create space for the prospectively larger root file system. The logical volumes of nearby data file systems can be backed up to tape or to another disk drive, and the logical volumes of nearby space file systems which are designated to store temporary data (e.g., temporary file systems or swap space) may be relocated or undesignated as valid storage areas.

Referring to FIG. 5, at provide free device step 510, a volume group named vgAPP is provided which includes at least a portion of disk drive 124 (for speed reasons) to temporarily store the file systems that must be relocated. The volume group includes enough space to hold the file systems. Although a logical device is provided at provide free device step, a physical device may be provided in the alternative.

Control then transitions to set up step 520. During set up step 520, temporary backup file systems are created to store the file systems that must be relocated. The temporary file systems are created on the provided volume group. The backup volume group may be provided on a physical storage device the same as or different from the physical storage device of the root volume group, or on a logical storage device the same as or different from the logical storage device already storing the information. Using the data collected during prepare identify layout step 310, above, the/usr file system is the only file system that must be relocated because the/tmp file system is disposable, and the primary swap has no data to save. Therefore, a temporary file system is created and mounted on the provided volume group, and the /usr file system is backed up to the temporary file system.

Making a new file system on another volume group is a standard system administration task. For example, the command lvcreate -L 375 -n usrbackup/dev/vgAPP creates a logical volume named usrbackup (option -n), having a size of 375 megabytes (option -L), and located within the provided volume group named vgAPP. The provided volume group vgAPP must have at least 375 megabytes for the/usr backup file system. Next, the newfs command constructs a new file system for the backup of/usr. Specifically, the command newfs/dev/vgAPP/rusrbackup creates a new file system on the newly created logical volume usrbackup. The raw logical volume was designated by the preceding the name of the logical volume with an "r" (e.g., rusrbackup). Next, the space of the newly created file system is applied to a particular directory. The mount command announces to the system that a removable file system is to be attached to the file tree at a directory indicated in the command line. The indicated directory becomes the root of the newly mounted file system. For example, the command mount/dev/vgAPP/usrbackup/mnt mounts the space of the backup file system against a previously created/mnt directory.

Control then transitions to backup step 530. During backup step 530, the /usr file system is backed up to the prepared file system on the provided free device, volume group vgAPP. The/usr file system may be loaded to the prepared file system on the backup device by either copying or moving the/usr file system. The dump command backs up a file system indicated in the command line. For example, the command dump 0sf 145000 /mnt/usrdump/dev/vg00/lvol4 specifies a fill dump (option 0) with a size of 145,000 meters (option s) in the file /mnt/usrdump. Because a disk drive was selected as the backup device, the tape length option s will have no effect in this embodiment. The option is included for uniformity of command. The command line argument/dev/vg00/lvol4 is the logical volume name of the original file system/usr. The dump command creates a large file containing the data from/usr in the/mnt directory on the volume group vg00.

Figure 6:
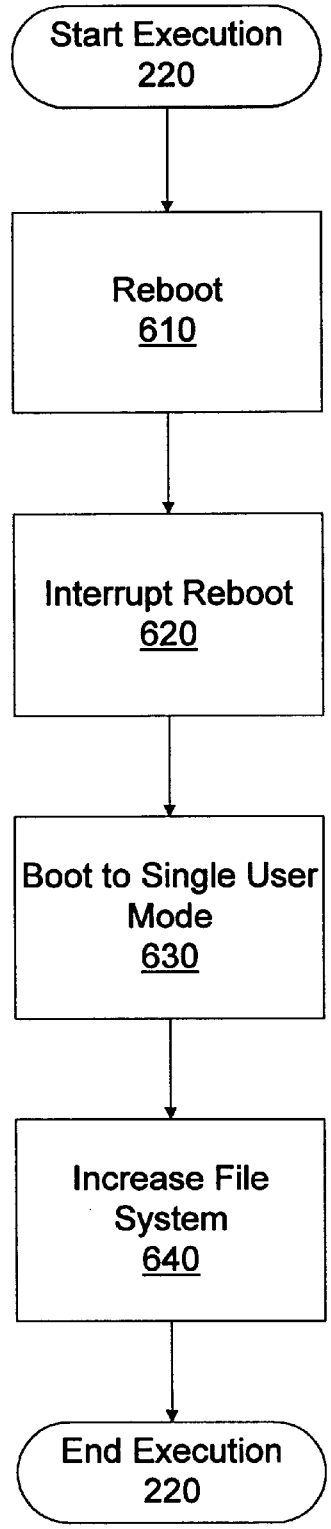
FIG. 6 shows a flow chart for executing an upgrade on the exemplary computer system of FIG. 1 according to an embodiment of the invention.

After the information that is nearby the root file system is moved to make space for the larger root file system during relocate step 320 (steps 510–530), control transitions to execute step 220. FIG. 6 shows a flow chart of the operation of an execution module for executing the upgrade of computer system 100 according to execute step 220.

At reboot step 610, computer system 100 is rebooted. The command reboot -q initiates a reboot of computer system 100 so that the computer system may be booted to single user mode.

Control then transitions to interrupt boot step 620. During interrupt boot step 620, the reboot of computer system 100 is interrupted. After computer system 100 performs its memory checks, computer system 100 provides an opportunity to interrupt the boot cycle. For example, computer system 100 prompts the user to "press any key to interrupt." Responsive to a boot process interrupt, computer system 100 displays a "Boot from primary path?" prompt, to which the user responds "y". Computer system 100 next displays an "Interact with IPL [Initial Program Loader]?" prompt, to which the user also responds "y".

Control then transitions to single user boot step 630. During single user boot step 630, computer system is booted to single user mode. For example, the command hpux is a specific secondary system loader (SSL) utility for loading the operating system kernel. The exemplary boot command hpux -lm/hp-ux boots computer system 100. The -lm option indicates that computer system 100 is to be booted to LVM maintenance mode (i.e., brought to single user mode without activating any volume groups). The -lm option configures only the root volume before initiating single user mode. The/hp-ux argument is the actual kernel file that computer system loads into memory. When computer system 100 is booted, computer system 100 is in single user mode and all volume groups are deactivated including the root volume group. At this point, the UNIX operating system has been installed into the memory of computer system 100. The root file system is not mounted.

Figure 7:
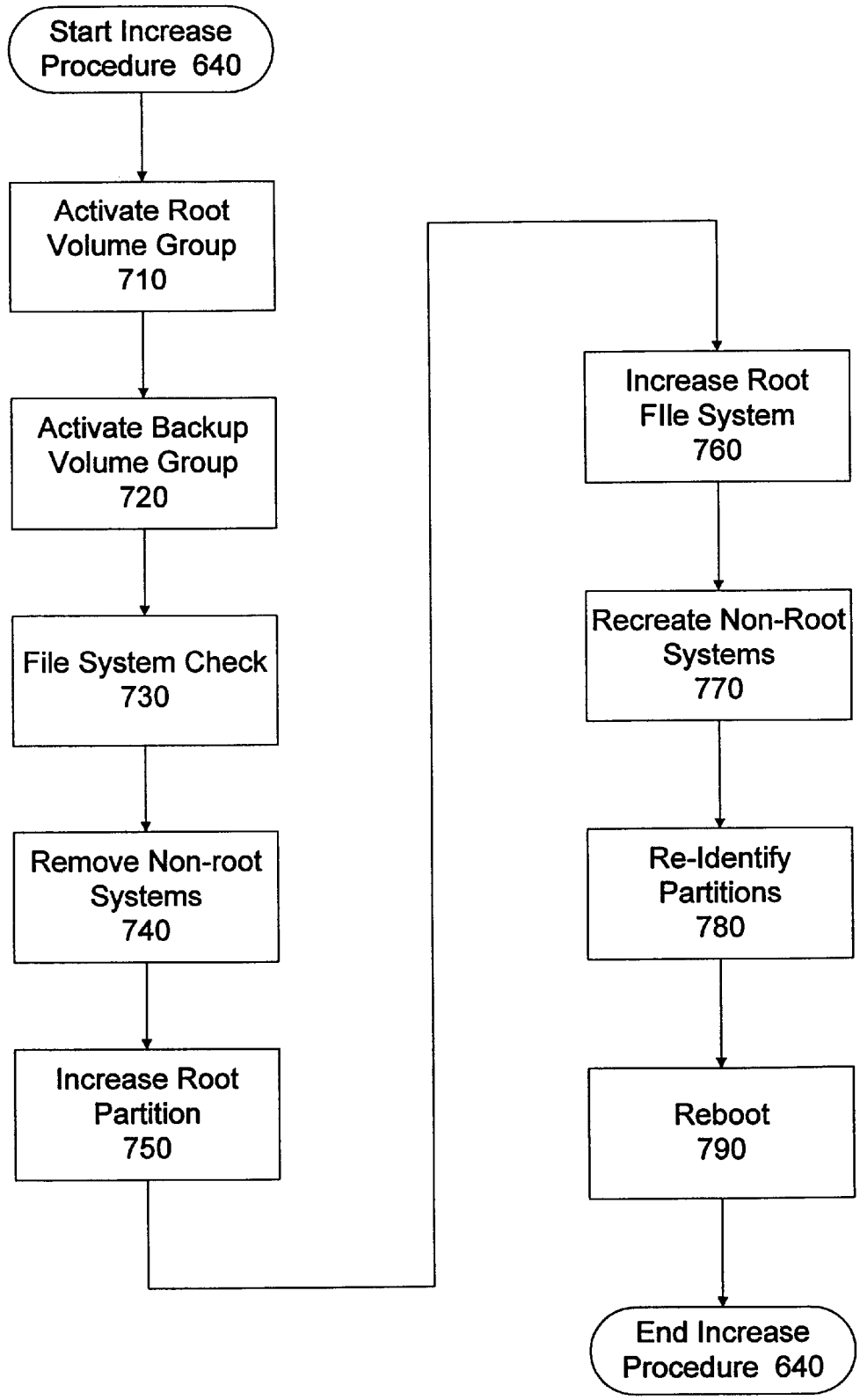
FIG. 7 shows a flow chart for increasing the size of the root file system according to an embodiment of the invention.

Control then transitions to increase root step 640. During increase root step 640, the root file system is increased in size. FIG. 7 shows a flow chart for increasing the size of the root file system according to increase root step 640.

At activate root step 710, the root volume group is activated, thereby making the root volume group available for manipulation. The command vgchange -a y/dev/vg00 activates the root volume group (vg00). The -a y option activates the particular volume group named by the immediately following argument (/dev/vg00), and activates all associated physical volumes (e.g., disk drives) and logical volumes.

Control then transitions to activate backup step 720. During activate backup step 720, the volume group where the backup information is stored is activated. The command vgchange -a y/dev/vgAPP activates the volume group (vgAPP) where the/usr file system is backed up. Thus, after steps 710 and 720, the root volume group and the/usr backup volume group are activated.

Control then transitions to file system check step 730. During file system check step 730, a file system consistency check is performed. The command fsck performs a file system consistency check and interactively repairs inconsistent conditions for HP-UX file systems on mass storage device files identified in the command line. For example, the command fsck/dev/vgAPP/rusrbackup performs the mandatory file system check against the backup file system.

Control then transitions to remove non-root systems step 740. During remove non-root systems step 740, the information stored at locations that are needed to increase the size of the root file system are undesignated as active storage locations. For example, the swap,/tmp and/usr file systems and logical volumes must be removed to make room for the expanded root file system. The lvremove command provides one method of removing the information by removing the corresponding logical volumes from the root volume group:

```
lvremove /dev/vg00/lvol2
lvremove /dev/vg00/lvol3
lvremove /dev/vg00/lvol4.
```

The above commands remove the primary swap logical volume (lvol2), the/tmp logical volume (lvol3), and the/usr logical volume (lvol4) from the root volume group (vg00). These logical volumes may be safely removed because the data in the/usr file system has already been backed up, the primary swap logical volume has no data to transfer, and the/tmp file system is disposable. Thus, only the root file system remains in the root volume group.

Control then transitions to increase root partition step 750. During increase root partition step 750, the lvextend command is used to increase the size (the number of physical extents) allocated to the root logical volume:

lvextend -L 300 /dev/vg00/lvol1.

The -L option instructs the system to increase the amount of space of the root logical volume (/dev/vg00/lvol1) to 300 Megabytes.

Control then transitions to increase root file system step 760. During increase root file system step 760, the following extendfs command increases the size of the root file system to take up all of the additional space allocated to the root file system during increase root partition step 750: extendfs/dev/vgoo/lvol1.

Control then transitions to recreate non-root systems step 770. During recreate non-root systems step 770, the information that was loaded to the alternative storage location (i.e., the data from the/usr file system) and the logical volumes that were removed are restored to the root volume group with the larger root logical volume. The swap,/tmp and/usr file systems and logical volumes are recreated and data is restored to/usr.

To recreate the non-root file systems, the logical volumes are recreated using the lvcreate command. If a logical volume name is included on the command line, the lvcreate command will create the named logical volume. If no logical volume name is specified, a system-generated name of the form lvolN is created, where N is the number of the new logical volume starting with the number 1. For example, the root logical volume (/dev/vg00/lvol1) already exists, so the following commands recreate, in order, the swap logical volume (/dev/vg00/lvol2), the/tmp logical volume (/dev/vg00/lvol3), and the /usr logical volume (/dev/vg00/lvol4), respectively:

```
lvcreate -d p -L 152 -C y -r n -s y -M n -c n /dev/vg00
       lvcreate -d p -L 152 /dev/vg00
       lvcreate -d p -L 440 /dev/vg00.
```

The options -d p settheparallel schedulingpolicy. The options -L 152 and -l 440 set the size of the respective logical volume back to what it was previously (152 MB for the swap and/tmp, and 440 MB for/usr-see identify swap size step 430, above). The option -C y sets the contiguous space requirement. The option -r n sets the no relocate option. The option -s y specifies that mirror copies cannot occupy the same disk. The option -M n turns off mirror write to the cache. The option -c n turns off mirror consistency recovery. The swap logical volume must be contiguous.

After the logical volumes are recreated, the/tmp and the/usr file systems are recreated with the following respective commands:

```
newfs /dev/vg00/rlvol3
newfs /dev/vg00/rlvol4.
```

No file system need be created for the primary swap space.

After the logical volumes and file systems are recreated, the data is restored to the/usr file system. For example, the following commands first create and mount the/usr backup file system to a temporary/mnt directory and secondly create and mount the new/usr file system to a temporary/mnt directory:

```
mkdir /mnt
mount /dev/vgAPP/usrbackup /mnt
mkdir /mnt1
mount /dev/vg00/lvol4 /mnt1
```

The current directory is then changed to/mnt1 using the cd/mnt1 command. The data from the/usr file system is restored to the new logical volume from the previously created backup file using the following restore command:

restore rf/mnt1/usrdump

The r option specifies that the restore is unconditional and overwrites existing files. The f option tells the program where to find the backup (/mnt1/usrdump). After changing directory away from/mnt1 (e.g., cd/), the/mnt and/mnt1 directories can be unmounted using the following commands:

umount/mnt1 umount/mnt.

Control then transitions to re-identify partitions step 780. During re-identify partitions step 780, the recreated root and swap logical volumes are re-identified to computer system 100. For example, the lvlnboot command is used to identify where the root logical volume and the primary swap logical volume, respectively, are located:

lvlnboot -r/dev/vg00/lvol1 lvlnboot -s/dev/vg00/lvol2.

If another boot disk definition was identified in identify boot step 420, above, the lvlnboot -r command would be used to identify the other boot disk.

Control then transitions to reboot step 790. During reboot step 790, computer system 100 is rebooted to make the changes take effect. The reboot -q command reboots computer system 100.

While the invention has been described with reference to various embodiments, it will be understood that these embodiments are illustrative and that the scope of the invention is not limited to them. Many variations, modifications, additions, and improvements of the embodiments described are possible.

For example, although the above commands may be entered into a computer system by a computer system user, the above commands may be included in a script or batch file which can be stored on a machine-readable or computer-readable storage medium such as disk drive 132 or a CD-ROM. Furthermore, a computer system may be configured to execute the above commands on another computer system, thereby performing the upgrade without reinstalling the operating system on the other computer system. This embodiment is useful in a distributed computing environment.

Also, those skilled in the art will recognize that the UNIX commands and options of the preferred embodiment are exemplary and that other commands and options of the UNIX operating system or similar operating systems (such as the IBM AIX operating system) may be used in accordance with the invention. Modifications to the above series of commands will be apparent to those skilled in the art.

Additionally, those skilled in the art will recognize that although the functions of the above referenced modules are performed by user inputs or software modules in the present embodiment, other types of modules may be used such as application specific hardware modules and configurable hardware modules. Also, the boundaries between modules are merely illustrative and alternative embodiments may merge modules or impose an alternate decomposition of functionality of modules. For example, a software module for identifying data storage areas (e.g., the usr file system) and a software module for identifying space storage areas (e.g., swap space) may be merged into a single identification module. Alternatively, a reboot module for rebooting a computer system may be decomposed into modules to perform the separate steps of the original reboot module. Moreover, alternative embodiments may combine multiple instances of a particular component.

These and other variations, modifications, additions, and improvements may fall within the scope of the invention as defined in the claims which follow.

What is claimed is:

1. In a computer system operating under control of a UNIX type operating system, the computer system including a first storage device, the first storage device including a root partition, the root partition including a root file system, a method for increasing the size of the root file system, the method comprising:

booting the computer system to a single user mode;

increasing the size of the root partition without reinstalling the UNIX type operating system;

increasing the size of the root file system without reinstalling the UNIX type operating system; and rebooting the computer system.

2. The method of claim 1 further comprising, before booting the computer system to single user mode:

identifying first information stored in a first information storage area of the first storage device, the first information storage area located such that the root partition is prevented from being increased in size, the first information requiring relocation from the first information storage area to create storage space for the root partition to be increased in size; and loading the first information, if first information is identified, to a backup storage area so the first information storage area is available for storing the root file system when the root file system is increased in size.

3. The method of claim 2 further comprising:

restoring the first information from the backup storage area to a storage area contiguous with the root partition after increasing the size of the root file system.

4. The method of claim 1 further comprising, before booting the computer system to single user mode:

identifying a second information storage area of the first storage device, the second information storage area for storing second information, the second information storage area located such that the root partition is prevented from being increased in size, the second information requiring removal from the second information storage area to create storage space for the root partition to be increased in size; and removing the second information from the second information storage area so the second information storage area is available for storing the root file system when the root file system is increased in size.

5. The method of claim 4 wherein the step of removing the second information includes undesignating the second information storage area as an active storage area.

6. The method of claim 4 further comprising:

recreating the second information on a storage area contiguous with the root partition after increasing the size of the root file system.

7. The method of claim 1 wherein the computer system further operates under control of a logical volume manager subsystem;

the first storage device is a root volume group, the root volume group further including a space logical volume designated for storage of temporary data; and a data logical volume including a data file system storing system data;

the method includes, before booting the computer system to single user mode identifying whether the data logical volume is located such that the root logical volume is prevented from being increased in size;

loading the data file system to a backup data file system if the data logical volume is located such that the root logical volume is prevented from being increased in size;

identifying whether the space logical volume is located such that the root logical volume is prevented from being increased in size;

removing the space logical volume if the space logical volume is located such that the root logical volume is prevented from being increased in size.

8. The method of claim 7 wherein the method further comprises: restoring the backup data file system to a data file system in a data logical volume on the root volume group after increasing the size of the root file system.

9. The method of claim 7 further comprising: recreating the space logical volume on the root volume group after increasing the size of the root file system.

10. The method of claim 7 wherein the step of loading the data file system to the backup data file system comprises:
   activating the root volume group after booting the computer system to single user mode;
   activating a backup volume group;
   creating a backup data file system; and transferring the data file system to the backup data file system.

11. The method of claim 1 wherein
   the first storage device is included within a distributed computing system, the distributed computing system including a server computer system and at least one client computer system;
   the root file system is accessible to the server computer system and to each of the plurality of computer systems; and
   the step of booting the computer system includes booting the server computer system to single user mode; and
   the step of rebooting the computer system includes rebooting the server computer system.

12. A first computer system configured to upgrade a second computer system operating under control of a UNIX type operating system, the second computer system including a root file system, the first computer system comprising:
   a first remote boot module, the first remote boot module remotely booting the second computer system to a single user mode;
   a partition resize module, the partition resize module increasing the size of the root partition without reinstalling the UNIX type operating system on the second computer system, the partition resize module increasing the size of the root partition responsive to the second computer system being booted to the single user mode;
   a file system resize module, the file system resize module increasing the size of the root file system without reinstalling the UNIX type operating system on the second computer system, the file system resize module increasing the size of the root file system responsive to the partition resize module increasing the size of the root partition; and
   a second remote boot module, the second remote boot module remotely rebooting the second computer system responsive to the file system resize module increasing the size of the root file system.

13. The first computer system of claim 12 further comprising:
   an identification module, the identification module identifying first information stored in a first information storage area on a first storage device of the second computer system, the first information storage area located such that the root partition is prevented from being increased in size, the first information requiring relocation from the first information storage area to create storage space for the root partition to be increased in size; and
   a load module, the load module loading the first information, if first information is identified by the identification module, to a backup storage area so the first information storage area is available for storing the root file system when the root file system is increased in size by the file system resize module, the load module loading the first information before the partition resize module increases the size of the root partition.

14. The first computer system of claim 13 further comprising:
   a restore module, the restore module restoring the first information from the backup storage area to a storage area contiguous with the root partition responsive to the file system resize module increasing the size of the root file system.

15. The first computer system of claim 12 further comprising:
   an identification module, the identification module identifying a second information storage area on a first storage device of the second computer system, the second information storage area for storing second information, the second information storage area located such that the root partition is prevented from being increased in size, the second information requiring removal from the second information storage area to create storage space for the root partition to be increased in size; and
   a remove module, the remove module removing the second information from the second information storage area so the second information storage area is available for storing the root file system when the root file system is increased in size, the remove module removing the second information before the partition resize module increases the size of the root partition.

16. The first computer system of claim 15 further comprising:
   a recreate module, the recreate module recreating the second information on a storage area contiguous with the root partition responsive to the file system resize module increasing the size of the root file system.

17. The first computer system of claim 12 wherein
   the second computer system further operates under control of a logical volume manager subsystem;
   the first storage device is a root volume group, the root volume group further including
      a space logical volume designated for storage of temporary data; and
      a data logical volume including a data file system storing system data;
   the first computer system includes
      a data identification module, the data identification module identifying whether the data logical volume is located such that the root logical volume is prevented from being increased in size;
      a load module, the load module loading the data file system to a backup data file system if the data logical volume is located such that the root logical volume is prevented from being increased in size;
      a space identification module, the space identification module identifying whether the space logical volume is located such that the root logical volume is prevented from being increased in size;
      a remove module, the remove module removing the space logical volume if the space logical volume is located such that the root logical volume is prevented from being increased in size.

18. The apparatus of claim 17 further comprising an identification module, the identification module including the data identification module and the space identification module.

19. The computer system of claim 12, wherein the first computer system and the second computer system are the same computer system.

20. The computer system of claim 12, wherein the first remote boot module and the second remote boot module are the same remote boot module operating at different times.

21. An apparatus for increasing the size of the root file system on a first computer system without reinstalling an operating system on the first computer system, the apparatus comprising:

a computer-readable storage medium; and an upgrade module stored on the computer-readable storage medium, the upgrade module, responsive to being accessed on a second computer system, upgrading a first computer system, wherein the first computer system operates under control of a UNIX type operating system, the first computer system includes a root file system, the first computer system is upgraded by increasing the size of the root file system without reinstalling the UNIX type operating system.

22. The apparatus of claim 21 wherein the upgrade module comprises:

a first reboot portion for remotely booting the first computer system to a single user mode;

a partition resize portion for increasing the size of the root partition without reinstalling the UNIX type operating system on the first computer system;

a file system resize portion for increasing the size of the root file system without reinstalling the UNIX type operating system on the first computer system; and a second reboot portion for remotely rebooting the first computer system.

23. The apparatus of claim 22 wherein the upgrade module further comprises:

a data identification portion for identifying first information stored in a first information storage area on a first storage device of the first computer system, the first information storage area located such that the root partition is prevented from being increased in size, the first information requiring relocation from the first information storage area to create storage space for the root partition to be increased in size; and a data load portion for loading the first information, if first information is identified, to a backup storage area so the first information storage area is available for storing the root file system when the root file system is increased in size.

24. The apparatus of claim 23 wherein the upgrade module further comprises:

a restoration portion for restoring the first information from the backup storage area to a storage area contiguous with the root partition after increasing the size of the root file system.

25. The apparatus of claim 22 wherein the upgrade module further comprises:

a space identification portion for identifying a second information storage area on a first storage device of the first computer system, the second information storage area for storing second information, the second information storage area located such that the root partition is prevented from being increased in size, the second information requiring removal from the second information storage area to create storage space for the root partition to be increased in size; and a space redesignation portion for removing the second information from the second information storage area so the second information storage area is available for storing the root file system when the root file system is increased in size.

26. The apparatus of claim 25 wherein the upgrade module further comprises:

a space recreation portion for recreating the second information on a storage area contiguous with the root partition after increasing the size of the root file system.

27. The apparatus of claim 21, wherein the first remote boot portion and the second remote boot portion are the same remote boot portion.

* * * * *